INVENTORS.
KENNETH DONALD MEYERS
CHARLES CLAYTON BARRETT
BY
*James T. Dunn*
ATTORNEY

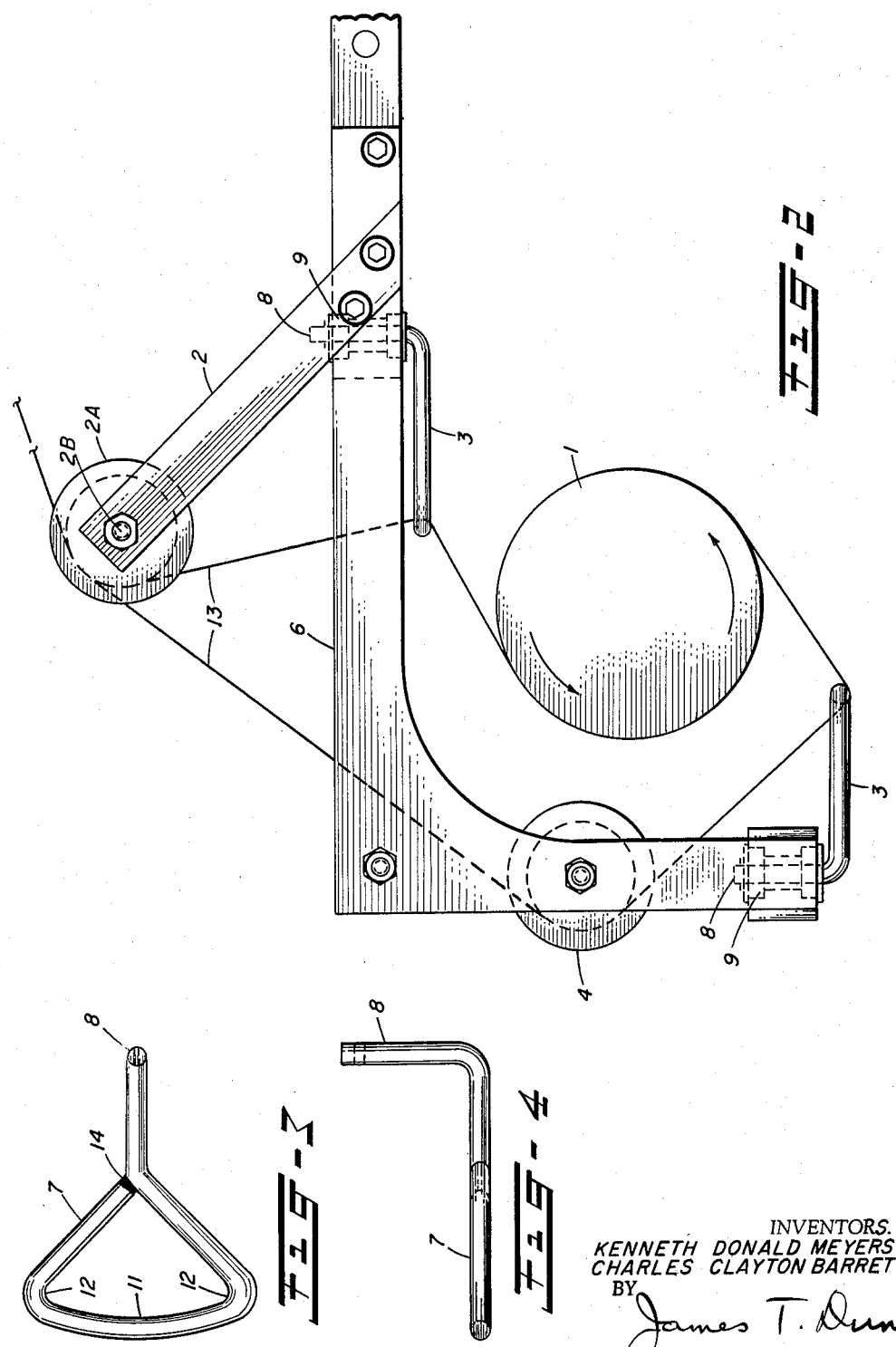

United States Patent Office 3,245,624
Patented Apr. 12, 1966

3,245,624
FILAMENT WINDING APPARATUS
Kenneth Donald Meyers, Cincinnati, and Charles Clayton Barrett, Middletown, Ohio, assignors to Formica Corporation, Cincinnati, Ohio, a corporation of Delaware
Filed Feb. 25, 1964, Ser. No. 347,152
1 Claim. (Cl. 242—7)

This invention relates to filament winding and, more particularly, to a piece of apparatus used in the production of filament wound objects. Still further, this invention relates to a spreader bail used in the filament winding apparatus.

One of the objects of the present invention is to produce a piece of apparatus for use in the manufacture of filament wound objects. A further object of the present invention is to produce a spreader bail which is used to distribute, controllably and evenly, filaments to a mandrel as a part of the apparatus of the present invention. These and other objects of the present invention will be discussed in greater detail hereinbelow.

The art of making filament wound objects is well established and well developed. A substantial plurality of references have been published which show varying techniques and pieces of apparatus that may be used in producing filament wound objects. One seemingly common denominator to a substantial plurality of these references resides in the application of filaments coated with a thermosetting resinous material to a mandrel generally in a helical fashion to the depth desired, curing the thermosetting resin by the application of heat and/or catalysis to form a hard solid rigid article which can then be removed from the mandrel as a tube. Although organic fibrous materials such as cotton have been used in these filament winding operations, because of the more recent developments in the areas of fiber glass, the fibrous materials used preponderantly today in filament windings are glass fibers and rovings. It has been known in the prior art that one can apply these glass filaments to a mandrel of some significant diameter from diametrically opposed feed positions but a problem arises when one endeavors to make a uniform application of the resin coated fibers to a mandrel of comparatively small diameter. Difficulties arise because of the tendency of the mandrel to engage in a whipping action when being covered by filaments. This whipping action results in a distortion of the ultimate rigid tube making it an unacceptable commercial product. This whipping or distortion effect is experienced on conventional pieces of apparatus even when the glass fibers are applied from diametrically opposed positions and particularly when applied from only one direction.

The apparatus of the present invention eliminates whipping of the mandrel by feeding the fibers on to the mandrel 180° apart thus balancing the load applied to the mandrel. This method of application also has the effect of dampening or eliminating the distortion of the mandrel resulting from centrifugal forces developed during the rotation. In aiding to accomplish this end result use is made of a plurality of pivoted spreader bails. These pivoted bails by their construction and movement maintain the relationship of the fibers being applied to the long axis of the mandrel at some constant, except when the carriage reverses. At this time they pivot and realign themselves for the return. This action from at least two directions applies an evenly distributed load to the mandrel and eliminates bending.

The apparatus of the present invention enables one to produce filament wound articles of comparatively small diameter that will have a substantially uniform distribution of the fibers around the mandrel without the disadvantage of the whipping effect or distortion referred to hereinabove.

Reference is made to the accompanying drawings in which FIG. 1 shows a front elevational view partly in section of the filament winder apparatus of the present invention.

FIG. 2 shows the side elevational view partly in section of the filament winder apparatus of the present invention.

FIG. 3 shows the spreader bail from a top elevational view.

FIG. 4 shows a side elevational view of the spreader bail.

Figure 1:
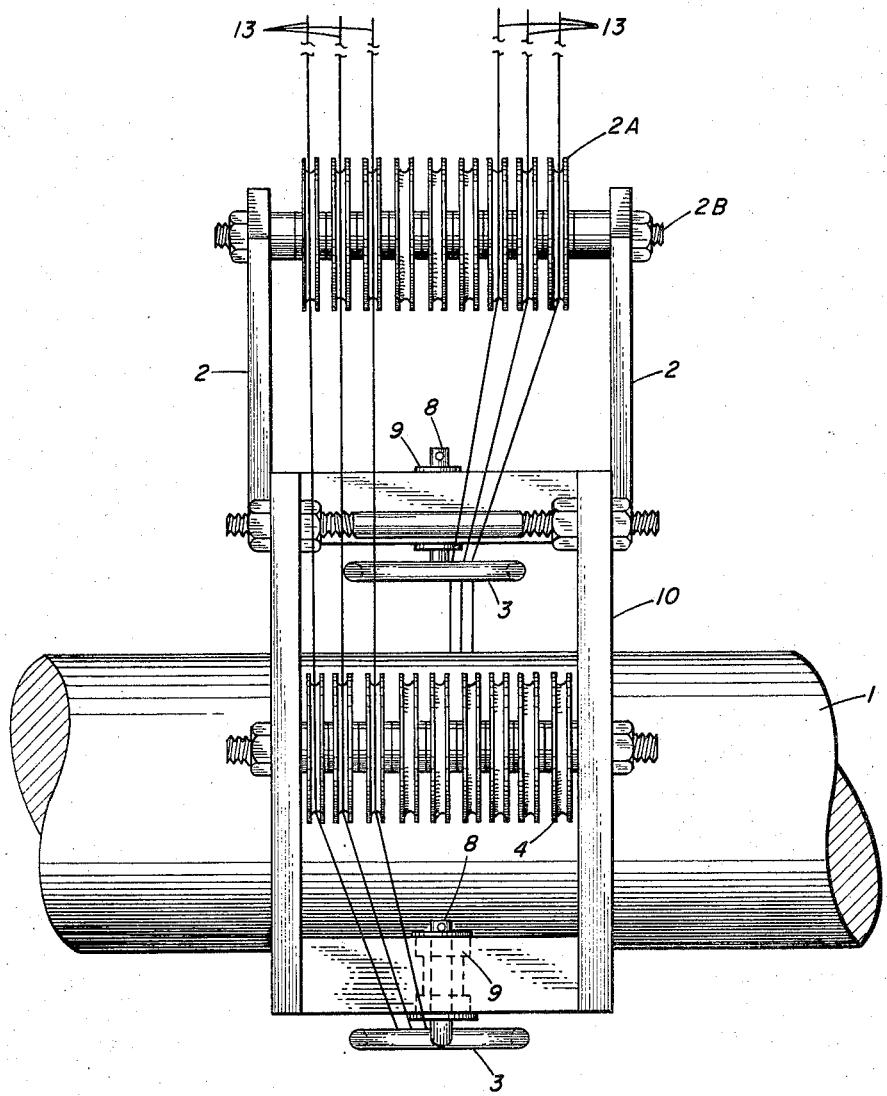

In FIG. 1, 1 is the mandrel which although capable of rotating about its axis is nevertheless stationary from the standpoint of lateral or vertical movement. Support arms 2 hold the filament guide wheels 2a in position but which are still capable of rotating freely about the axis 2b so as to guide the filaments 13 down through the spreader bails 3. In going to the lower spreader bail 3, approximately one-half of the filaments are directed beyond the distribution wheels 2a to the distribution wheels 4, so as to enable filaments to be applied to the mandrel 1 from diametrically opposed positions. The distribution wheels 2a and 4 are grooved in order to prevent the filaments from roping or entangling in their path to the spreader bails. The entire assembly 10 is designed to move laterally in a reciprocating motion substantially to each of the extreme ends of the mandrel during operation while the mandrel is rotating. The spreader bails are pivotally mounted in the socket 9.

The spreader bail as shown in FIGURES 3 and 4 requires a mounting pivot 8 which is secured in a socket 9 by means of a cotter pin or other suitable retaining member. The mounting pivot is substantially at a 90° angle to the plane movement of the spreader bail. The shaped member 7 attached to the mounting pivot has a central arc section 11 which has a substantially uniform curvature which is equal in all sections to the distance from the mounting pivot 8. At each end of the central arc section 11 there is located a terminus arc 12 which has a lesser radius than the radius of the central arc 11 and the center of each of said lesser arcs is located on a line which bisects the central arc. The spreader bail need not be joined at the shoulder where the two arms extend outwardly to form the arc sections but for the sake of strength characteristics, it is preferred that it be secured by a brazing 14 or some other suitable connecting mechanism.

We claim:
An apparatus for use in the manufacture of filament wound objects comprising:
 (A) a rotatable but laterally stationary mandrel;
 (B) a frame means mounted for reverse lateral movement in a direction parallel to the axis of said rotatable mandrel;
 (C) a source of filaments;
 (D) a means for distributing said filaments around said mandrel from diametrically opposed positions, including spreader bails through which the filaments pass;
 (E) a means for mounting said bails for pivotal movement on said frame means;
 (F) said bails each including a shaped member attached at an angle to said mounting means for movement in a plane substantially at a 90° angle from said mounting means;
 (G) each of said shaped members having a central arc section which is furthest removed from said mounting pivot, said central arc section having a substantially uniform curvature and equal to the distance from said mounting pivot, said central arc section having on each of the extremities of said arc, a terminus arc of a lesser radius than the central arc, the center of each of lesser said arcs being located on a line bisecting the central arc.

References Cited by the Examiner

UNITED STATES PATENTS

| 2,927,745 | 3/1960 | Shook | 242—157 X |
|---|---|---|---|
| 2,991,147 | 7/1961 | Thomas | 156—167 |
| 3,024,589 | 3/1962 | Vaughan | 57—162 |

FOREIGN PATENTS

| 1,234,958 | 5/1960 | France. |
| 825,737 | 12/1951 | Germany. |

STANLEY N. GILREATH, *Primary Examiner.*

MERVIN STEIN, B. S. TAYLOR, *Assistant Examiners.*